United States Patent [19]

Kimura et al.

[11] Patent Number: 5,405,880
[45] Date of Patent: Apr. 11, 1995

[54] POLYOLEFINIC COMPOSITION HAVING OXYGEN BARRIER PROPERTY, AS WELL AS SHEET AND CONTAINER MADE OF SAID COMPOSITION

[75] Inventors: Katsuhiko Kimura; Yuusuke Terauchi; Toshikazu Katoh; Takeo Tomatsuri; Noaki Masuda; Takeo Kato; Mitch Kohno; Kiichiro Hirose; Keiko Nakamura; Hiroshi Umeyama; Tatuo Furuse; Hiroharu Nagahama, all of Tokyo, Japan

[73] Assignee: Toppan Printing Co., Ltd., Tokyo, Japan

[21] Appl. No.: 960,058

[22] Filed: Oct. 14, 1992

[51] Int. Cl.$^6$ .............................................. C08K 5/09
[52] U.S. Cl. ..................... 523/126; 206/524.2; 206/524.3; 206/524.9; 206/819; 428/35.1; 428/35.7; 428/36.91; 428/516; 428/41; 428/42; 524/357; 524/398
[58] Field of Search ............... 523/126, 125, 136, 137; 524/357, 398; 525/333.7, 370; 428/41, 42, 35.7, 36.91, 516, 35.2; 264/268; 206/819, 524.2, 524.3, 524.9

[56] References Cited

U.S. PATENT DOCUMENTS

| | | | |
|---|---|---|---|
| 2,984,634 | 5/1961 | Caldwell et al. | 525/333.7 |
| 3,017,376 | 7/1962 | Balford et al. | 525/333.7 |
| 3,332,926 | 7/1967 | Baron et al. | 525/333.7 |
| 3,513,152 | 5/1970 | Hogan | 523/333.7 |
| 3,563,869 | 2/1971 | Rainer et al. | 525/333.7 |
| 3,592,792 | 7/1971 | Newland et al. | 523/126 |
| 3,673,152 | 6/1972 | Minagawa et al. | |
| 3,797,690 | 3/1974 | Taylor et al. | 523/126 |
| 3,825,627 | 7/1974 | McGaugh | 523/126 |
| 3,827,342 | 11/1974 | Walton | 525/333.7 |
| 3,847,852 | 11/1974 | White et al. | 523/125 |
| 4,028,480 | 6/1977 | Brasseur | 523/126 |
| 4,067,836 | 1/1978 | Potts et al. | |
| 4,178,280 | 12/1979 | Hill | |
| 5,096,941 | 3/1992 | Harnden | 523/126 |
| 5,108,807 | 4/1992 | Tucker | 428/35.2 |
| 5,211,875 | 5/1993 | Speer et al. | 428/352 |
| 5,217,118 | 6/1993 | Mochizuki et al. | 206/524.2 |
| 5,310,497 | 5/1994 | Speer et al. | 206/524.2 |

FOREIGN PATENT DOCUMENTS

| | | |
|---|---|---|
| 301676 | 2/1989 | European Pat. Off. |
| 2154596 | 5/1973 | France |
| 1926547 | 1/1970 | Germany |

*Primary Examiner*—Veronica P. Hoke
*Attorney, Agent, or Firm*—Armstrong, Westerman, Hattori, McLeland & Naughton

[57] ABSTRACT

The improved resin composition including a polyolefin, a transition metal containing oxidation catalyst and 0–500 ppm of a radical inhibitor can be used to fabricate a sheet and a container that have good oxygen barrier quality on its own without being combined with expensive other resins that have oxygen barrier quality.

9 Claims, No Drawings

5,405,880

POLYOLEFINIC COMPOSITION HAVING OXYGEN BARRIER PROPERTY, AS WELL AS SHEET AND CONTAINER MADE OF SAID COMPOSITION

BACKGROUND OF THE INVENTION

This invention relates to a polyolefin containing resin composition, as well as a sheet and a container that are made of said resin composition and that have an oxygen barrier property. This invention also relates to a process for producing such a sheet and container having an oxygen barrier property.

Polyolefins are thermoplastic and can be shaped by various techniques including melt extrusion, injection molding and blow molding. In addition, polyolefins are inexpensive. Because of these advantages, polyolefins are extensively used as materials for packaging films and sheets, as well as in the manufacture of bottles and other containers.

A major disadvantage of polyolefins is their high oxygen permeability, so in order to package foods and other materials that dislike oxygen, they have to be used in lamination with other resins that are expensive and that have an oxygen barrier property, as exemplified by ethylene/vinyl acetate copolymers and polyvinylidene chloride.

SUMMARY OF THE INVENTION

The present invention has been accomplished under these circumstances and has as an object providing a polyolefinic resin composition that exhibits an effective oxygen barrier property on its own without using expensive other resins that have oxygen barrier quality.

Another object of the present invention is to provide a sheet having oxygen barrier quality using said polyolefinic resin composition.

A further object of the present invention is to provide a process for producing said sheet.

Still another object of the present invention is to provide a container having oxygen barrier quality using said polyolefinic resin composition.

Yet another object of the present invention is to provide a process for producing said container.

As a result of the intensive studies conducted in order to attain these object, the present inventors found that they could be attained by a polyolefinic resin composition comprising a polyolefin, an oxidation catalyst and 0–500 ppm of a radical inhibitor, an oxygen barrier sheet made of that composition, an oxygen barrier container made of that composition, as well as processes for producing that oxygen barrier sheet and container.

DETAILED DESCRIPTION OF THE INVENTION

Any oxidation catalyst can be used in the present invention as long as it promotes the oxidation of polyolefins with oxygen, whereby the oxygen that would otherwise penetrate or permeate through the polyolefin of interest is reacted with the latter to reduce its oxygen permeability and hence improve its oxygen barrier quality. Metal catalysts made of transition metals in a compound form are preferably used as such oxidation catalysts. The ions of transition metals, as they make a transition from the oxidized to reduced state and vice versa, permit oxygen to react with polyolefins and this would be the mechanism by which those transition metals work as oxidation catalysts.

Preferred examples of transition metals that can be used in the present invention include Co, Mn, Fe, Cu, Ni, Ti, V and Cr, with Co being particularly preferred. Compounds of these metals include salts with organic acids such as stearic acid, acetylacetonic acid, dimethyldithiocarbamic acid, linoleic acid and naphthenic acid.

Aluminum compounds can also be used as oxidation catalysts in the present invention because of their many advantages including cleanliness, colorlessness and low cost.

The oxidation catalysts described above are preferably contained in the polyolefinic composition in amounts of at least 100 ppm in terms of the weight of metal atoms. From the viewpoint of oxygen barrier quality, those oxidation catalysts are preferably contained in high concentrations but if their content is excessive, rapid oxygen absorption leads to the deterioration of polyolefins, which will cause haze, lower strength and other defects in sheets and otherwise shaped parts of polyolefins. Therefore, to avoid these problems, oxidation catalysts are preferably used in amounts not exceeding 2,000 ppm in the polyolefinic composition.

Radical inhibitors are typically used in polyolefinic resins in order to prevent the generation of radicals or to eliminate the radicals once formed. However, the use of such radical inihibitors is either entirely avoided or limited to a content of 500 ppm in the resin composition of the present invention. Radical inhibitors that may be used in the present invention are classified into four major types: a static heat stabilizer that inhibits a radical reaction (oxidation reaction) by adding hydrogen atoms to the radicals generated in an oxidation reaction; a dynamic heat stabilizer that decomposes and consumes peroxides to prevent the generation of radicals, thereby inhibiting an oxidation reaction; a radical trapping agent that acts on generated radicals in such a way that they are reactively bonded together to inhibit an oxidation reaction; and a uv absorber that absorbs the energy of light to become a compound in the excited state, which reverts back to the initial ground state upon releasing the absorbed energy of light, thereby preventing the photo-excited generation of radicals.

A specific example of the dynamic heat stabilizer is tris(2,4-di-t-butylphenyl)phosphite (IRGAFOS 168 of CIBA-GEIGY Corp.)

Specific examples of the static heat stabilizer include: triethylene glycol-bis[3-(3-t-butyl-5-methyl-4-hydroxyphenyl)propionate] (IRGANOX 245 of CIBA-GEIGY Corp.), 1,6-hexanediol-bis[3-(3,5-di-t-butyl-4-hydroxyphenylpropionate] (IRGANOX 259 of CIBA-GEIGY Corp.), 2,4-bis-(n-octylthio)-6-(4-hydroxy-3,5-di-t-butylanilino)-1,3,5-triazine (IRGANOX 565 of CIBA-GEIGY Corp.), pentaerythrityltetraquis[3-(3,5-di-t-butyl-4-hydroxyphenyl)propionate] (IRGANOX 1010 of CIBA-GEIGY Corp.), 2,2-thio-diethylenebis[3-(3,5-di-t-butyl-4-hydroxyphenyl)propionate] (IGRANOX 1035FF of CIBA-GEIGY Corp.), octadecyl-3-(3,5-di-t-butyl-4-hydroxyphenyl)propionate (IRGANOX 1076 of CIBA-GEIGY Corp.), N,N'-hexamethylenebis(3,5-di-t-butyl-4-hydroxyhydrocinnamide (IRGANOX 1098 of CIBA-GEIGY Corp.), 3,5-di-t-butyl-4-hydroxy-benzylphosphonate-diethyl ester (IRGANOX 1222 of CIBA-GEIGY Corp.), 1,3,5-trimethyl-2,4,6-tris(3,5-di-t-butyl-4-hydroxybenzyl)benzene (IRGANOX 1222 of CIBA-GEIGY Corp.), bis(ethyl-3,5-di-t-butyl-4- hydroxybenzylphosphonate)calcium (IRGANOX 1425WL of CIBA-GEIGY Corp.), tris(3,5-di-t-butyl-4-hydroxybenzyl)isocyanurate (IRGANOX 3114 of CIBA-GEIGY Corp.), octylated diphenylamine (IRGANOX 5057 of CIBA-GEIGY Corp.), and 2,4-bis[-(octylthio)methyl]-o-cresol (IRGANOX 5057 of CIBA-GEIGY Corp.)

Specific examples of the radical trapping agent include: the polycondensation product of dimethyl succinate and 1-(2-hydroxyethyl)-4-hydroxy-2,2,6,6-tetramethylpiperidine (TINUVIN 622LD of CIBA-GEIGY Corp.), poly[{6-(1,1,3,3-tetramethylbutyl)amino-1,3,5-triazine-2-4-diyl}{(2,2,6,6-tetramethyl-4-piperidyl-)iminohexamethylene (CHIMASSORB 944FL of CIBA-GEIGY Corp.), and the condensation product or N,N'-bis(3-aminopropyl)ethylenediamine and 2,4-bis[N-butyl-N-(1,2,2,6,6-pentamethyl-4-piperidyl-)amino]-6-chloro-1,3,5-triazine (CHIMASORB 119FL of CIBA-GEIGY Corp.)

Specific examples of uv absorbers include: 2-(5-methyl-2-hydroxyphenyl)benzotriazole (TINUVIN PFL of CIBA-GEIGY Corp.), 2-[2-hydroxy-3,5-bis(2,2-dimethylbenzyl)penyl]-2II-benzotriazole (TINUVIN 234 of CIBA-GEIGY Corp.), 2,-(3,5-di-t-butyl-2-hydroxyphenyl)benzotriazole (TINUVIN 320 of CIBA-GEIGY Corp.), 2-(3-t-butyl-5-methyl-2-hydroxyphenyl)-5-chlorobenzotriazole (TINUVIN 326 of CIBA-GEIGY Corp.), 2-(3,5-di-t-butyl-2-hydroxyphenyl)-5-chlorobenzotriazole (TINUVIN 327 of CIBA-GEIGY Corp.), 2-(3,5-di-t-amyl-2-hydroxyphenyl)benzotriazole (TINUVIN 328 of CIBA-GEIGY Corp.), and 2-(2'-hydroxy-5'-t-octylphenyl)-benzotriazole (TINUVIN 329 of CIBA-GEIGY Corp.)

The polyolefinic composition does not contain those radical inhibitors or contains them in amounts of up to 500 ppm, preferably up to 100 ppm. When the content of radical inhibitors in the polyolefinic composition exceeds 500 ppm, they will inhibit the oxidation reaction of polyolefins and the reaction for oxygen absorption is inhibited to increase the oxygen permeability of the polyolefins. It should be particularly noted that commercial polyolefins are not preferred for the purposes of the present invention since radical inhibitors are incorporated in large amounts in order to prevent deterioration that would otherwise occur during thermal formation of the polyolefins.

Polyolefins that can be used in the present invention include polyethylenes such as low-density polyethylene. medium-density polyethylene and high-density polyethylene, polypropylene, polybutene, polypentene, ethylene-propylene copolymers, ethylene-butene copolymers, and ethylenepentene copolymers, from the viewpoint of oxygen barrier quality, homo- and copolymers of propylene monomers are preferred.

The polyolefinic composition of the present invention may also contain other thermoplastic resins than polyolefins.

The resin composition of the present invention can be shaped into sheets, containers and other packaging materials by means of various thermal forming techniques, such as melt extrusion molding for making films, sheets and pipes, injection molding for making containers, and blow molding for making bottles and other hollow containers. Blow molding can be performed in two different ways, one being an extrusion blow molding process which consists of making a parison by extrusion molding and then blowing it, and the other being an injection blow molding process which consists of making a preform by injection molding and then blowing it.

Another preferred method consists of mixing a metal catalyst with a polyolefin of interest, leaving the mixture to stand until the polyolefin is oxidized, blending the resulting composition with another polyolefin, and extrusion-molding the blend into a sheet.

The resin composition of the present invention can be shaped at temperatures in the range of 200°–320° C. which is customarily used in the thermal formation of polyolefins. If necessary, shaping temperatures of up to about 350° C. can be employed. Generally, polyolefins are thermally formed at comparatively low temperatures in order to prevent thermal deterioration that would otherwise take place during forming. In the present invention, however, there is no need to consider thermal deterioration since the oxidation catalyst will decompose upon heating to promote the generation of radicals and this enables the resin composition to be shaped at fairly high temperatures.

The thickness of the shaped article is preferably at least 50 $\mu$m, more preferably at least 100 $\mu$m, most preferably at least 400 $\mu$m. Thicknesses less than 50 $\mu$m are insufficient to achieve the desired oxygen barrier quality.

The sheet, packaging material, container and other shaped articles of the resin composition of the present invention may be single-layered or, alternatively, they may be laminated with other various layers. A polyolefin layer containing an oxidation catalyst decomposes by absorbing oxygen during standing over time and experiences deterioration as manifested by reduced strength or bleeding due to the formation of micro-crystals. In order to avoid these problems and maintain the overall strength of a container, the polyolefin layer is preferably laminated with a shape-retaining resin layer made or a material that will not deteriorate in strength over time. If a transition metal is used as the oxidation catalyst, the inside surface of a food packaging material or container is preferably laminated with a transition metal free layer in order to avoid direct contact with the food contents. In a preferred embodiment, one or both sides of the polyolefin layer containing an oxidation catalyst are laminated with a layer of another thermoplastic resin such as one that does not contain an oxidation catalyst. Layers of other thermoplastic resins that can be used include those which are made of polyesters, polyolefins, polyamides, polyvinyl chloride, polyvinylidene chloride, polyacrylonitrile, polycarbonates or modified products thereof. The polyolefin layer containing an oxidation catalyst and layers of other thermoplastic resins can be laminated by various methods including lamination using adhesives, coextrusion, co-injection molding, co-extrusion blow molding, and co-injection blow molding.

The polyolefinic resin composition of the present can be used in many and various applications as described below. First, they may be used as container materials for storing foods and other articles that will be readily denatured by oxygen. In this case, as already mentioned, foods and other contents are preferably prevented from contact with transition metals by providing transition metal free resin layers on the inner surface of the container. Sheets or films of the resin composition can be used as bag materials, blister pack materials or the lid of containers. Pipes of the resin composition can be used as containers by sealing the opening at both ends with a suitable means such as a metallic lid. Injection molded containers or bottles may be immediately used as practical containers.

In the present invention, films, sheets, containers, bottles and other articles shaped from the polyolefinic resin composition of the present invention may be exposed to radiations or subjected to a corona discharge treatment so as to enhance and improve the oxygen barrier performance of the composition. Preferred radiations suitable for this purpose include α-rays, β-rays, γ-rays, X-rays and electron beams, with the last mentioned electron beams being particularly preferred for several reasons including the convenience of equipment and the procedural safety. Exposure to electron beams means accelerating thermions at high voltage in vacuo and applying them onto an article of interest. Radiations including electron beams are preferably applied at doses of at least 30 KGy, more preferably at least 50 KGy.

Radiations are applied to at least one side of a film, a sheet, a container or a bottle if they are made of a single polyolefin layer containing an oxidation catalyst. Exposure to radiations is also effective even if one or both sides of the oxidation catalyst containing polyolefin layer is laminated with another resin layer that does not contain an oxidation catalyst. Radiations may be applied to any side of films, etc. but they are preferably applied to the side having the polyolefin layer containing an oxidation catalyst. Exposure to radiations may be performed by various known methods.

The oxygen barrier quality of the laminate based on the oxidation catalyst containing polyolefin sheet of the present invention will be suppressed if there is an adjacent resin layer containing an antioxidant. Even in this case, the desired oxygen barrier quality is guaranteed by performing exposure to radiations in the manner described above. A probable mechanism for this phenomenon is that irradiation permits more radicals to be formed to surpass the inhibition of their generation by antioxidants or that irradiation promotes the generation of radicals in areas where the effects of antioxidants are less intense.

A corona discharge treatment makes use of "corona discharge", a phenomenon in which a conductor placed under high voltage in the air undergoes dielectric breakdown only in the area that is close to its surface and which has a large potential gradient, with the resulting discharge being sustained until a plasma called "corona" develops in the discharged area. For the purposes of the present invention, the corona discharge treatment is preferably conducted with power applied at a value of at least 50 W/m$^2$ per min, more preferably at least 100 W/m$^2$ per min. Any articles can be subjected to a corona discharge treatment and they include films, sheets, containers, bottles, etc. In making laminated sheets, corona discharge can be produced by applying a high voltage between a roller supporting the substrate and an opposing electrode, with the substrate being continuously passed between the roller and the electrode to perform the intended treatment on the surface or the substrate. When performing a corona discharge treatment on hollow articles such as containers and bottles, the two electrodes may be positioned in such a way that one of them is inserted into the container while the other is put outside so that the container wall is held between the two electrodes.

For the purposes of the present invention, a corona discharge treatment is desirably applied to the surface of a polyolefin layer containing an oxidation catalyst. It is generally difficult to insure that the corona discharge treatment works effectively across the thickness of a resin layer. If the article to be treated is composed of a single polyolefin layer containing an oxidation catalyst, either side of the layer can be effectively treated by corona discharge. However, when an oxidation catalyst free resin layer is laminated on one side or the polyolefin layer containing an oxidation catalyst, the other side of the polyolefin layer must be subjected to a corona discharge treatment. In other words, the corona discharge treatment will prove little effective if an oxidation catalyst free resin layer is provided on both sides of the polyolefin layer containing an oxidation catalyst.

Polyolefins will readily form radicals if they are subjected to the action of light or heat during thermal shaping or storage in the presence of oxidation catalysts, and the formed radicals will react with aerial oxygen to become peroxy radicals, which in turn react with the polyolefin to generate hydroperoxides and radicals. The generated hydroperoxides are believed to decompose to an alkoxy radical and a hydroxy radical, which in turn react with the polyolefin to produce radicals.

By employing the specified features of the present invention, particularly by incorporating an oxidation catalyst in a polyolefin resin, more radicals would be generated in the manner described above, whereby the reaction for the polyolefin to absorb oxygen through radical reaction is enhanced and the resulting consumption of aerial oxygen contributes to an improvement in the oxygen barrier quality of the polyolefinic resin layer. Both exposure to radiations and corona discharge treatment would be effective in enhancing the generation of radicals to achieve a further improvement in the oxygen barrier quality of the polyolefinic resin layer by virture of the applied energy of radiations or corona discharge.

The following examples are provided for the purpose of further illustrating the present invention but are in no way to be taken as limiting.

Example 1

Polypropylene having a melt index (M.I.) of 0.5 that contained 10 ppm of cobalt stearate in terms of the concentration of cobalt atoms but which did not contain a radical inhibitor was extrusion molded at 260° C. to form a single-layered sheet of polypropylene 800 μm thick, which was designated sample 1.

Additional samples 2–6 and comparative sample 1 were prepared by repeating the same procedure except that the concentration of cobalt atoms in cobalt stearate was changed to the values shown in Table 1.

Immediately after their preparation by extrusion molding, the individual samples were left to stand at 25° C. for measuring the time-dependent profile of their oxygen permeability with MOCON Ox-TRAN 100 (Modern Controls, Inc.) The results are also shown in Table 1.

TABLE 1

| Sample No. | Concentration of cobalt stearate, ppm | Oxygen permeability, ml/m$^2$.day/atom | | | | |
|---|---|---|---|---|---|---|
| | | 0 day | 7 days | 14 days | 28 days | 58 days |
| 1 | 10 | 126.8 | 124.3 | 122.2 | 112.7 | 81.6 |
| 2 | 25 | 145.3 | 142.5 | 137.2 | 114.3 | 82.9 |
| 3 | 50 | 137.1 | 136.4 | 124.7 | 98.0 | 42.7 |
| 4 | 100 | 137.2 | 125.9 | 105.2 | 71.0 | 22.0 |
| 5 | 200 | 105.4 | 82.7 | 50.6 | 11.4 | 0.1 |
| 6 | 1000 | 6.6 | 0.1 | 0.1 | 0.1 | 0.1 |

TABLE 1-continued

| Sample No. | Concentration of cobalt stearate, ppm | Oxygen permeability, ml/m².day/atom | | | | |
|---|---|---|---|---|---|---|
| | | 0 day | 7 days | 14 days | 28 days | 58 days |
| Comparison 1 | 0 | 151.3 | 151.2 | 151.2 | 151.1 | 151.0 |

As Table 1 shows, the addition of cobalt stearate as an oxidation catalyst was effective in causing a substantial drop in the oxygen permeability of polyolefin.

Example 2

Additional sheet samples 7-12 were prepared by repeating the procedure of Example 1 for the preparation of sample 1, except that cobalt stearate was replaced by aluminum stearate or aluminum acetylacetonate that were used in the amounts indicated in Table 2, and that the temperature for extrusion molding was set at 220° C. These samples were subjected to the same evaluation as in Example 1 and the results are also shown in Table 2.

TABLE 2

| Sample No. | Type and concentration of oxidation catalyst* (ppm) | Oxygen permeability, ml/m².day/atm | | | | |
|---|---|---|---|---|---|---|
| | | 0 day | 7 days | 14 days | 28 days | 58 days |
| 7 | A 100 | 145.7 | 146.3 | 134.6 | 143.4 | 138.6 |
| 8 | A 200 | 153.2 | 140.3 | 123.2 | 119.3 | 110.2 |
| 9 | A 500 | 150.2 | 149.8 | 145.9 | 106.5 | 107.6 |
| 10 | B 100 | 132.2 | 125.6 | 111.9 | 119.3 | 117.6 |
| 11 | B 200 | 140.4 | 136.8 | 131.0 | 125.4 | 123.7 |
| 12 | B 500 | 138.6 | 137.5 | 133.8 | 128.4 | 123.1 |

*A: aluminum stearate;
B: aluminum acetylacetonate

The concentration of each oxidation catalyst is expressed in terms of aluminum atoms.

As is clear from Table 2, oxygen barrier quality could also be achieved by using aluminum containing oxidation catalysts.

Example 3

Additional sheet samples 13-36 and comparative samples 2-7 were prepared by repeating the procedure of Example 1 for the preparation of sample 5, except that in addition to the oxidation catalyst, the radical inhibitors shown in Table 3 were incorporated in polyolefin, which was extrusion molded at 220° C. to make sheets having a thickness of 1,000 μm. Each of these samples was subjected to the same evaluation as in Example 1 and the results are shown in Tables 3, 4 and 5.

TABLE 3

| Sample No. | Type and concentration of radical inhibitor** (ppm) | Oxygen permeability, ml/m².day/atm | | | | |
|---|---|---|---|---|---|---|
| | | 0 day | 7 days | 14 days | 28 days | 58 days |
| 13 | a 10 | 97.9 | 67.9 | 33.2 | 0.2 | 0 |
| 14 | a 50 | 99.1 | — | 43.0 | 5.0 | — |
| 15 | a 100 | 102.8 | 96.3 | 96.3 | 88.2 | 68.5 |
| Comparison 2 | a 1000 | 104.4 | 96.7 | 98.2 | 96.7 | 95.8 |
| 16 | b 5 | 35.0 | — | 0.6 | 0 | — |
| 17 | b 10 | 77.7 | 13.2 | 0.3 | 0.1 | — |
| 18 | b 50 | 77.6 | — | 6.0 | 0.3 | — |
| 19 | b 100 | 84.3 | 59.7 | 32.8 | 0.1 | 0.1 |
| 20 | b 500 | 88.2 | — | 52.1 | 20.0 | — |
| 21 | b 700 | 95.1 | — | 78.3 | 50.1 | — |
| Comparison 3 | b 1000 | 95.8 | 92.5 | 88.7 | 83.1 | 62.2 |

(The remaining space is left blank.)

TABLE 4

| Sample No. | Type and concentration of radical inhibitor** (ppm) | Oxygen permeability, ml/m².day/atm | | | | |
|---|---|---|---|---|---|---|
| | | 0 day | 7 days | 14 days | 28 days | 58 days |
| 22 | c 5 | 25.2 | — | 0.7 | 0.1 | — |
| 23 | c 10 | 65.9 | 5.7 | 0.1 | 0.1 | 0.1 |
| 24 | c 50 | 75.2 | — | 9.0 | 0.3 | — |
| 25 | c 100 | 97.7 | 78.2 | 43.5 | 0.2 | 0.1 |
| 26 | c 500 | 97.8 | — | 48.7 | 24.0 | — |
| 27 | c 700 | 100.1 | — | 81.2 | 71.0 | — |
| Comparison 4 | c 1000 | 104.9 | 95.4 | 91.3 | 82.4 | 15.0 |
| 28 | d 10 | 89.3 | 47.0 | 16.2 | 0.1 | — |
| 29 | d 50 | 92.3 | — | 23.0 | 0.1 | — |
| 30 | d 100 | 96.3 | 65.5 | 34.6 | 0.1 | — |
| Comparison 5 | d 1000 | 95.8 | 85.8 | 92.1 | 91.7 | — |

(The remaining space is left blank.)

TABLE 5

| Sample No. | Type and concentration of radical inhibitor** (ppm) | Oxygen permeability, ml/m².day/atm | | | | |
|---|---|---|---|---|---|---|
| | | 0 day | 7 days | 14 days | 28 days | 58 days |
| 31 | e 10 | 96.2 | 58.6 | 4.4 | 0.2 | — |
| 32 | e 50 | 99.2 | — | 29.1 | 4.0 | — |
| 33 | e 100 | 100.8 | 88.5 | 90.2 | 87.6 | — |
| Comparison 6 | e 1000 | 97.7 | 91.4 | 101.4 | 105.4 | — |

TABLE 5-continued

| Sample No. | Type and concentration of radical inhibitor** (ppm) | Oxygen permeability, ml/m².day/atm | | | | |
|---|---|---|---|---|---|---|
| | | 0 day | 7 days | 14 days | 28 days | 58 days |
| 34 | f 10 | 100.5 | 56.3 | 13.6 | 0.1 | — |
| 35 | f 50 | 97.3 | — | 37.8 | 3.0 | — |
| 36 | f 100 | 102.1 | 89.3 | 78.2 | 66.3 | — |
| Comparison 7 | f 1000 | 99.9 | 90.7 | 101.0 | 97.0 | |

**Radical inhibitors
a: IRGANOX1010
b: IRGAFOS168
c: TINUVIN622LD
d: TINUVIN326
e: IRGAFOS168/IRGANOX1010 = 2/1
f: IRGAFOS168/IRGANOX1010 = 1/1

As is clear from Tables 3, 4 and 5, the smaller the content of radical inhibitor, the lower the oxygen permeability and hence the better oxygen barrier quality. In contrast, the drop in oxygen permeability was negligible in comparative samples 2–7 which contained more than 1,000 ppm of radical inhibitors.

Example 4

Additional sheet samples 37–39 were prepared by repeating the procedure of Example 1 for the preparation of sample 5 except that the sheet thickness was adjusted as shown in Table 5. These samples were subjected to the same evaluation as in Example 1 and the results are shown in Table 6 together with the data for sample 5.

TABLE 6

| No. | Sheet sample Thickness, μm | Oxygen permeability, ml/m².day/atm | | | | |
|---|---|---|---|---|---|---|
| | | 0 day | 7 days | 14 days | 28 days | 58 days |
| 37 | 200 | 520.6 | 466.2 | 417.4 | 263.4 | 218.4 |
| 38 | 400 | 266.0 | 213.0 | 135.0 | 32.1 | 15.3 |
| 39 | 1200 | 78.4 | 62.9 | 0.1 | 0.1 | 0.1 |
| 5 | 800 | 105.4 | 82.7 | 50.6 | 11.4 | 0.1 |

(The remaining space is left blank.)

Example 5

Polypropylene (M.I. 0.5) that contained cobalt stearate at predetermined concentrations of cobalt atoms (see Table 7) but which did not contain a radical inhibitor was extrusion molded at 260° C. to form single-layered sheets of polypropylene 800 μm thick. A biaxially oriented polyester film having a thickness of 5.4 μm, 12 μm or 25 μm was laminated on both sides of each polypropylene sheet using a urethane resin adhesive, whereby laminated sheet samples 40–44 were prepared. These samples were subjected to the same evaluation as in Example 1 and the results are shown in Table 7.

Comparative samples 8–10 were prepared by repeating the procedures for preparing samples 41–43, respectively, except that no cobalt stearate was contained. These comparative samples were subjected to the same evaluation as above and the results are also shown in Table 7.

TABLE 7

| Sample No. | Co concentration, ppm | Thickness of OPET on one side, μm | Oxygen permeability, ml/m².day/atm | | | |
|---|---|---|---|---|---|---|
| | | | 1 day | 14 days | 30 days | 60 days |
| Invention | | | | | | |
| 40 | 200 | 25 | 0.2 | 0.1 | 0.1 | 0.1 |
| 41 | 200 | 12 | 0.2 | 0.1 | 0.1 | 0.1 |
| 42 | 200 | 5.4 | 4.0 | 0.1 | 0.1 | 0.1 |
| 43 | 500 | 12 | 0.2 | 0.1 | 0.1 | 0.1 |
| 44 | 500 | 5.4 | 0.1 | 0.1 | 0.1 | 0.1 |
| Comparison | | | | | | |
| 8 | 0 | 25 | 17.6 | 17.4 | 17.5 | 17.2 |
| 9 | 0 | 12 | 34.1 | 33.9 | 34.4 | 34.3 |
| 10 | 0 | 5.4 | 54.2 | 54.5 | 54.1 | 53.9 |

Example 6

An additional sample 45 was prepared by repeating the procedure of Example 1 for the preparation of sample 5, except that the extrusion temperature was adjusted to 250° C., that the sheet thickness was changed to 400 μm, and that after extrusion molding, one surface of the sheet was exposed to electron beams at an acceleration voltage of 200 kV for a total dose of 5 Mrad. Another sample 46 was prepared by repeating this procedure except that the total exposure dose of electron beams was increased to 10 Mrad. Still another sample 47 was prepared by repeating the same procedure except that exposure to electron beams was not performed. The three samples thus prepared were subjected to the same evaluation as in Example 1 and the results are shown in Table 8 below.

TABLE 8

| Sheet sample No. | Exposure dose, Mrad | Oxygen permeability, ml/m².day/atm | | | |
|---|---|---|---|---|---|
| | | 0 day | 7 days | 14 days | 30 days |
| 45 | 5 | 120.0 | 65.0 | 38.0 | 12.0 |
| 46 | 10 | 53.0 | 32.0 | 18.0 | 6.0 |
| 47 | none | 266.0 | 213.0 | 135.0 | 20.0 |

As is clear from Table 8, exposure to electron beams was effective in enhancing the oxygen barrier quality of polypropylene.

Example 7

Polypropylene A (M.I. 0.5) that contained 200 ppm of cobalt stearate in terms of the concentration of cobalt atoms but which did not contain a radical inhibitor, and polypropylene B that contained neither oxidation catalyst nor radical inhibitor were co-extrusion molded at 250° C. to form a two-ply laminated sheet that consisted of polypropylene layers A and B in respective thicknesses of 500 μm and 250 μm. The side of the laminated sheet that had the layer of polypropylene A containing the oxidation catalyst was exposed to electron beams under the same conditions as in Example 6 for the preparation of sample 46, whereby sheet sample 48 was obtained. An additional sample 49 was prepared by repeating the same procedure except that exposure to electron beams was not performed. Each sample was subjected to the same evaluation as in Example 6 and the results are shown in Table 9.

Example 8

Polypropylene A (M.I. 0.5) that contained 200 ppm of cobalt stearate in terms of the concentration of cobalt atoms but which did not contain a radical inhibitor and polypropylene B that contained neither oxidation catalyst nor radical inhibitor were co-extrusion molded at 250° C. to form a three-ply laminated sheet that consisted of three propylene layers B, A and B in respective thicknesses or 250 μm, 500 μm and 250 μm. One side of the laminated sheet was exposed to electron beams under the same conditions as in Example 6 for the preparation of sample 46, whereby sheet sample 50 was obtained. An additional sample 51 was prepared by repeating the same procedure except that exposure to electron beams was not performed. Each sample was subjected to the same evaluation as in Example 6 and the results are shown in Table 9.

TABLE 9

| Sheet sample | | Oxygen permeability, ml/m².day/atm | | | | |
|---|---|---|---|---|---|---|
| No. | Exposure dose, Mrad | 0 day | 7 days | 14 days | 30 days | 180 days |
| 48 | 10 | 10.0 | 4.0 | 2.0 | 1.5 | 1.5 |
| 49 | none | 117.0 | 70.0 | 15.0 | 10.0 | 4.0 |
| | | 0 day | 7 days | 14 days | 32 days | |
| 50 | 10 | 11.0 | 10.0 | 8.0 | 5.0 | — |
| 51 | none | 117.0 | 70.0 | 15.0 | 8.0 | — |

As is clear from Table 9, propylene sheets of good oxygen barrier quality could be produced by performing exposure to electron beams whether they were two- or three-ply laminates.

Example 9

An additional sample 52 was prepared by repeating the procedure of Example 1 for the preparation of sample 5, except that the extrusion temperature was adjusted to 250° C., that the sheet thickness was changed to 400 μm, and that after extrusion molding, one surface of the sheet was subjected to a corona discharge treatment with a power of 667 W/m² per min for a width of 0.6 m at a line speed of 10 m/min. Another sample 53 was prepared by repeating this procedure except that no corona discharge treatment was performed. Each or these samples was subjected to the same evaluation as in Example 1 and the results are shown in Table 10.

Example 10

Polypropylene A (M.I. 0.5) that contained 200 ppm of cobalt stearate in terms of the concentration of cobalt atoms but which did not contain a radical inhibitor, and polypropylene B that contained neither oxidation catalyst nor radical inhibitor were co-extrusion molded at 250° C. to form a two-ply laminated sheet that consisted of polypropylene layers A and B in respective thicknesses of 500 μm and 250 μm. The side of the laminated sheet that had the layer of polypropylene A containing the oxidation catalyst was subjected to a corona discharge treatment under the same conditions as in Example 9 for the preparation of sample 52 except that the applied power was changed to the values shown in Table 10, whereby sheet samples 54 and 55 were obtained. An additional sample 56 was prepared by repeating the same procedure except that no corona discharge treatment was conducted. Each of the three samples was subjected to the same evaluation as in Example 9 and the results are shown in Table 10.

TABLE 10

| Sheet sample | | Oxygen permeability, ml/m².say/atm | | | |
|---|---|---|---|---|---|
| No. | Corona discharge power, W/m².min | 0 day | 7 days | 14 days | 30 days |
| 52 | 667 | 204.0 | 82.0 | 65.0 | 13.0 |
| 53 | none | 266.0 | 213.0 | 135.0 | 20.0 |
| 54 | 667 | 101.0 | 33.0 | 32.0 | 19.0 |
| 55 | 100 | 101.0 | 62.0 | 43.0 | 28.0 |
| 56 | none | 134.0 | 98.0 | 70.0 | 38.0 |

As is clear from Table 10, the oxygen barrier quality of propylene sheets could be enhanced by corona discharge treatment.

Example 11

Polypropylene (M.I. 0.5) that contained 200 ppm of cobalt stearate in terms of the concentration of cobalt atoms and which did not contain a radical inhibitor was extrusion molded at 260° C. to form a single-layered sheet of polypropylene, which was subsequently stored indoors for 4 months (sheet α).

Sheet α was ground into particles and added in an amount of 0.2 part by weight to one part by weight of polypropylene containing no radical inhibitor. To the mixture, cobalt stearate was added in such an amount that the total concentration off cobalt atoms would be 200 ppm. and the resulting blend was extrusion molded at 220° C. to form a single-layered sheet of polypropylene in a thickness of 800 μm, which was designated sample 57. This sheet was subjected to the same evaluation as in Example 1 and the results are shown in Table 11.

Example 12

The ground particles of sheet α prepared in Example 11 were added in an amount of 0.25 part by weight to one part by weight of polypropylene containing no radical inhibitor. The resulting blend and polypropylene B containing neither oxidation catalyst nor radical inhibitor were co-extrusion molded at 220° C. to form a three-ply laminated sheet having a total thickness of 1 mm that consisted of the intermediate blend layer (400 μm) sandwiched between polypropylene B layers each having a thickness of 300 μm, whereby sample 58 was obtained. This sample was subjected to the same evaluation as in Example 1 and the results are shown in Table 11.

TABLE 11

| Sample No. | Oxygen permeability, ml/m².day/atom | | |
|---|---|---|---|
| | 0 day | 14 days | 28 days |
| 57 | 121.2 | 0.4 | 0.1 |
| 58 | 116.2 | — | 17.2 |

As is clear from Table 11, the oxygen barrier quality of a polypropylene sheet could be improved by blending with a polypropylene composition that had been oxidized upon standing.

Example 13

Polypropylene (M.I. 0.5) that contained 200 ppm of cobalt stearate (oxidation catalyst) in terms of the concentration of cobalt atoms but which did not contain a radical initiator was extrusion blow-molded to fabricate a bottle having a capacity of 900 ml, a surface area of $2.4 \times 10^{-2}$ m² and an average wall thickness of 900 μm in the body. This bottle was designated sample 101. Additional samples 102–104 and comparative sample 101 were fabricated by repeating the same procedure except that cobalt stearate was replaced by the oxidation catalysts shown in Table 12. More additional samples 105 and 106 and comparative sample 102 were fabricated by repeating the procedure of the fabrication of sample 101 except that the concentration of cobalt atoms in cobalt stearate was changed as shown in Table 12 and that the average wall thickness of the body was reduced to 500 μm. Immediately after their fabrication by extrusion blow molding, samples 101–106 and comparative samples 101 and 102 were left to stand at 25° C. for measuring the time-dependent profile of oxygen permeability with MOCON Ox-TRAN 100 (Modern Controls, Inc). For samples 105 and 106 and comparative sample 102, the oxygen permeability measurement was conducted only on the 30th day. The results are shown in Table 12.

TABLE 12

| | Bottle sample | | | | |
|---|---|---|---|---|---|
| | Oxidation catalyst*** and its concentration, | Oxygen permeability, ml/m$^2$.day/atm | | | |
| No. | ppm | 10 days | 30 days | 60 days | 90 days |
| 101 | A | 13.5 | 0.3 | 0.0 | 0.0 |
| 102 | C | 107.2 | — | — | 74.5 |
| 103 | D | 120.6 | — | — | 97.7 |
| 104 | E | 54.5 | 3.1 | 0.6 | 0.4 |
| Comparison 101 | none | 116.3 | 116.3 | 116.3 | 116.3 |
| 105 | A | — | 2.6 | — | — |
| 106 | A | — | 4.7 | — | — |
| Comparison 102 | none | — | 165.0 | — | — |

***C: aluminum acetylacetonate
D: titanium oxyacetylacetonate
E: manganese acetylacetonate As described in detail on the foregoing pages, the present invention provides a polyolefinic resin composition that exhibits an effective oxygen barrier property on its own without using expensive other resins that have oxygen barrier quality. The present invention also provides a sheet and a container that have oxygen barrier quality using such an improved polyolefinic resin composition. Further, the present invention provides processes for producing such a sheet and container.

What is claimed is:

1. A hollow container having an oxygen barrier property that is made from a laminate comprising (i) a layer that degrades over time by absorbing oxygen, said layer made from a polyolefinic resin composition that comprises a polyolefin, a transition metal and 0–500 ppm of a radical inhibitor and (ii) a shape-retaining resin layer made from a material which will not deteriorate in strength over time and which does not contain said transition metal or said radical inhibitor, wherein at least one said shape-retaining layer is an innermost layer of said laminate and which is exposed to an interior of said container.

2. A process for producing a hollow container from a laminated sheet having an oxygen barrier property comprising melt extruding a polyolefinic resin composition containing a polyolefin, a transition metal and 0–500 ppm of a radical inhibitor, and laminating thereto a shape-retaining resin that is free from said transition metal and said radical inhibitor, thereby producing a laminated sheet comprising (i) a layer that degrades over time and (ii) a shape-retaining layer, and forming a hollow container from said laminated sheet, wherein at least one said shape-retaining layer is an innermost layer of said laminated sheet and which is exposed to an interior of said container.

3. The process of claim 2, wherein said laminating step comprises joining said polyolefinic resin composition to said shape-retaining resin by an adhesive.

4. The process of claim 2, wherein said laminating step comprises joining said polyolefinic resin composition to said shape-retaining resin by coextrusion.

5. The process of claim 2, wherein said laminating step comprises joining said polyolefinic resin to said shape-retaining resin by co-injection molding.

6. The process of claim 2, wherein said laminating step comprises joining said polyolefinic resin to said shape-retaining resin by blow molding.

7. The process of claim 2, further comprising subsequently exposing said laminated sheet to radiations.

8. The process of claim 2, further comprising subsequently performing a corona discharge treatment on a surface of said laminated sheet.

9. A process for producing a hollow container having a barrier property, which comprises making a parison or preform from the composition recited in claim 2 and subsequently blow molding said parison or preform.

* * * * *